US008640250B2

(12) United States Patent
Hughes et al.

(10) Patent No.: US 8,640,250 B2
(45) Date of Patent: Jan. 28, 2014

(54) SYSTEM AND METHOD FOR MANAGING SUPERIOR/SUBORDINATE INTERACTIONS

(75) Inventors: Joy R. Hughes, Oak Hill, VA (US); Steven Wattenmaker, Washington, DC (US)

(73) Assignee: CSMentor, Inc., Fairfax, VA (US)

( * ) Notice: Subject to any disclaimer, the term of this patent is extended or adjusted under 35 U.S.C. 154(b) by 1127 days.

(21) Appl. No.: 12/533,364

(22) Filed: Jul. 31, 2009

(65) Prior Publication Data

US 2010/0031326 A1 Feb. 4, 2010

Related U.S. Application Data

(60) Provisional application No. 61/085,168, filed on Jul. 31, 2008.

(51) Int. Cl.
*H04L 29/06* (2006.01)
*G06F 21/00* (2013.01)

(52) U.S. Cl.
USPC ............................................ 726/26; 705/301

(58) Field of Classification Search
None
See application file for complete search history.

(56) References Cited

U.S. PATENT DOCUMENTS

| 2004/0044554 A1 | 3/2004 | Bull et al. |
| 2005/0277102 A1 | 12/2005 | Gillette et al. |
| 2007/0299853 A1 | 12/2007 | Knotz et al. |

*Primary Examiner* — Gilberto Barron, Jr.
*Assistant Examiner* — Simon Kanaan
(74) *Attorney, Agent, or Firm* — Akerman LLP; Michael K. Dixon (57) ABSTRACT

A system and method for automating the creation, optimization and deployment of multimedia, interactive, mentoring communication modules ("MIPs") is provided. Simplified interfaces allow superiors to generate MIPs and asynchronously deploy them to subordinates' mobile devices or personal computers. The completed MIP are automatically coded for optimal performance on specific mobile operating systems to which they are deployed. Automatic notifications are sent to registered subordinates upon deployment of a completed MIP. User configurable and system updatable management portals and subordinate portals are automatically generated to provide a user interface to enable mentoring interactions between the superior and subordinates. The MIPs allow custom tailoring of educational and developmental exercises. Performance of the exercises can be monitored by a superior for each of a plurality of subordinates.

21 Claims, 7 Drawing Sheets

SYSTEM AND METHOD FOR MANAGING SUPERIOR/SUBORDINATE INTERACTIONS

CROSS REFERENCE TO RELATED APPLICATIONS

This application claims priority to U.S. Provisional Patent Application No. 61/085,168 filed on Jul. 31, 2008 which is incorporated herein by reference in its entirety.

FIELD OF THE INVENTION

The present invention relates to the field of mobile computing and more particularly to automated content development and deployment to mobile platforms.

BACKGROUND OF THE INVENTION

The field of mobile computing relates to various mobile computing devices and mobile communication devices. Mobile content generally includes data and software that can be deployed to and executed on such mobile platforms. Heretofore-known systems and methods for developing and deploying mobile content have generally been designed for use by software developers and others with specialized knowledge and training.

An example of such a development system is provided by the Hot Lava Mobile software ("Hot Lava") by OutStart Inc. of Boston, Mass. Hot Lava allows users to develop, deliver and track mobile content such as business marketing applications and educational applications which are executable on mobile platforms.

While complex development systems such as Hot Lava may be useful for mid-size to large corporations or institutions which are staffed with skilled trainers and instructional designers, they are generally unsuitable for average consumers to use for developing simple on the fly but media rich mobile applications. Because such heretofore-known mobile content development systems have been developed for corporate or institutional customers, they are also too expensive for average consumers to implement.

Group leaders such as teachers and coaches are increasingly using mobile platforms to communicate with students and team members. Homework assignments, lesson plans and schedules can be instantaneously transmitted to students via mobile communication devices. Such communications are typically limited to emails, text messages and cell phone calls which are unsuitable if the group leader desires to provide a large amount of data or multi-media content for individual group members. Information may also be posted by a group leader to a common website that is accessible by group members using mobile devices. However, group websites are generally static and are not tailored to provide custom information to individual group members.

SUMMARY OF THE INVENTION

An illustrative embodiment of the invention provides a system and method in which a designated or self-identified group leader such as a teacher, coach, advocate, influencer, or other "superior" can, with basic computer skill and no training, use "point and click" operations on their personal computer ("PC") to create a multimedia, interactive, mentoring communication module, hereinafter referred to as a Mobile Interactive Practice Program or "MIP".

The MIP can be deployed asynchronously to the superior's selected or self-designated students', team members' or other "subordinates'" mobile devices and personal computers. Key aspects of the MIP creation and deployment can be effected by the superior using automated processes and methods.

The system according to illustrative embodiments of the invention can deploy a MIP to mobile devices by coding the completed MIP for optimal performance on specific mobile operating systems, mobile browsers, and mobile media players which are registered by each of the subordinates. The system automatically generates a short message service ("SMS") notification to the subordinate with an embedded link to the MIP. The system can also automatically detect the mobile phone number of a subordinate accessing a MIP from their mobile device in order to automatically authenticate the user and provide immediate access without requiring a manual login operation.

Illustrative embodiments of the system can provide the superior with a management screen that can be used to perform functions such as inviting new subordinates to register; managing existing subordinates and teams to which the superior may assign them; creating new modules and editing existing modules; viewing subordinates' MIP utilization and performance on any included exercises; posting the subordinates' own user-generated MIP-content to a broader community of the superior's colleagues; reviewing content uploaded by the subordinates and authorizing distribution of such content to other subordinates; sending and receiving messages to individual subordinates, sub-groups of subordinates, or an entire subordinate population.

In the illustrative embodiments, the superior has ultimate control over the superior's database. Such control allows the superior to add a subordinate or file of subordinates and delete subordinates, for example. The superior can also close a MIP database to any new people who attempt to register.

The present invention provides an affordable means for group leaders such as teachers and coaches to quickly and easily develop and deploy mobile content for group members. It also provides for development of mobile content that includes interactive applications and multi-media applications executable on mobile devices and applications which are custom tailored for particular group members. The present invention further advantageously provides a platform for group leaders to develop and deploy such mobile content without using expensive development tools or requiring extensive training.

BRIEF DESCRIPTION OF THE DRAWINGS

The foregoing and other features and advantages of the present invention will be more fully understood from the following detailed description of illustrative embodiments, taken in conjunction with the accompanying drawings in which.

DETAILED DESCRIPTION

An illustrative embodiment of the invention provides a system and method in which a superior can easily create, deploy and use a multimedia, interactive, mentoring communication module, hereinafter referred to as a Mobile Interactive Practice Program or "MIP". The MIP can be deployed to subordinates' mobile devices and personal computers. Key aspects of the MIP creation and deployment can be effected by the superior using automated processes and methods as described herein.

Figure 1:
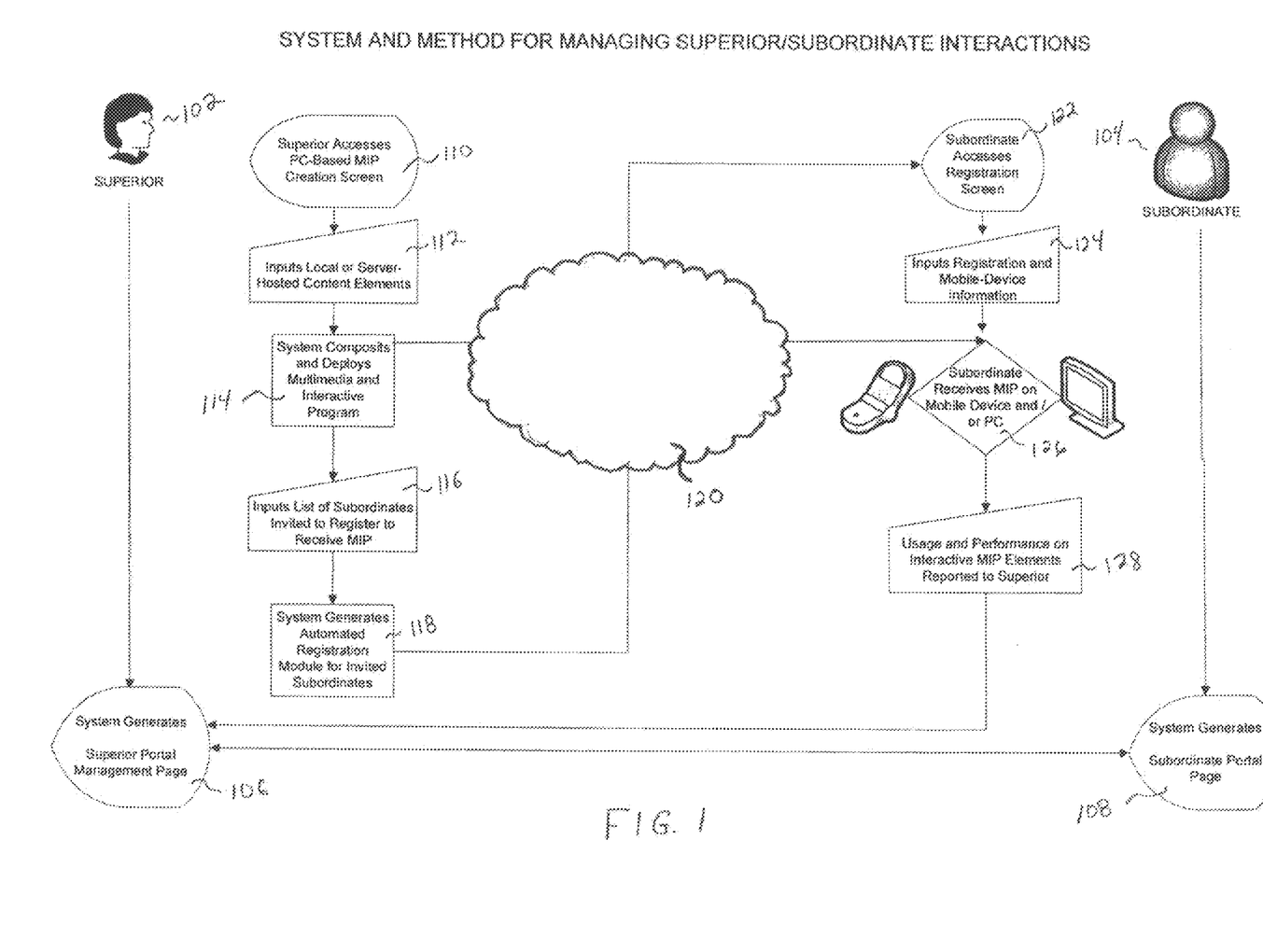
FIG. 1 is a high level process flow diagram of a system and method for managing superior/subordinate interactions according to an illustrative embodiment of the invention.

A system and method for managing superior/subordinate interactions according to an illustrative embodiment of the invention is described with reference to FIG. 1. A superior 102 interacts with a subordinate 104 by causing the system to generate a superior portal management page 106 and a subordinate portal page 108. The superior accesses a PC-based MIP creation screen 110 and inputs local or server hosted content elements 112. The system then automatically generates and deploys the MIP 114. The superior inputs a list of subordinates who he wishes to be invited to register to receive the MIP 116. The system then generates an automated registration module 118 for invited subordinates.

One skilled in the art should appreciate that the content elements for selection by the superior can be provided directly by superior or selected from any number of sources. For example, the system may include an internal database of selectable content or may be in communication with any number of content libraries wherein content may be provided by a superior's colleagues or other third parties.

The automated registration module 118 is communicated to a subordinate's PC or mobile device over a network 120 such as the Internet and/or a cellular telephone network, for example. The subordinate 104 accesses a registration screen 122 and inputs registration and mobile device information 124. The subordinate 104 receives the MIP on his mobile device or PC 126 from the system via the network 120. The subordinate's usage and performance on interactive MIP elements are then automatically reported to the superior 102 via the superior portal management page 106.

Figure 2:
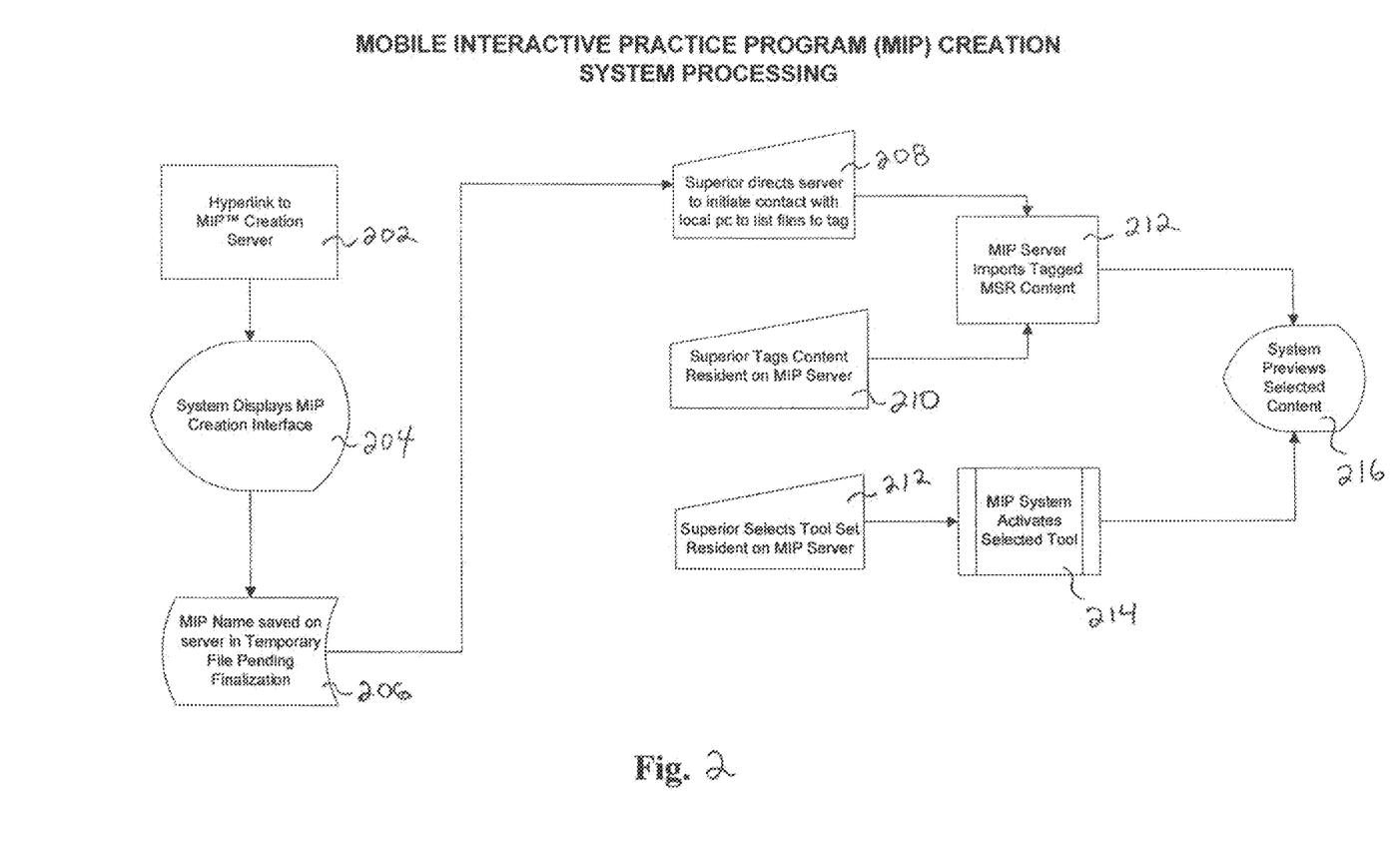
FIG. 2 is process flow diagram of a MIP creation system according to an illustrative embodiment of the invention.

MIP creation system processing according to an illustrative embodiment of the invention is described with reference to FIG. 2. A superior accesses the system to create a MIP by clicking on a Hyperlink to a MIP Creation Server™ 202. The system then displays a MIP creation interface 204 to the superior. A MIP name is then saved in a temporary file on the server pending finalization 206. The superior then directs the server to initiate contact with a local PC to list files to be tagged. The superior tags content resident on the MIP server 210 and the MIP server imports the tagged content 212. The superior may also select a tool set resident on the MIP server 212. The MIP server activates the selected tools 214. Once the tagged content has been imported to the MIP server 212 and the MIP server has activated selected tools 214, the MIP creation system generates a preview of selected content 216 for viewing by the superior.

The MIP creation process enables a superior such as coach to choose material from content libraries to include in his MIP. The MIP creation system automates the coach's ability to record audio independent of the audio-recording technology resident on the coach's PC.

In illustrative embodiments of the invention, the MIP creation system detects the original file format of user-submitted video and automatically converts and optimizes it for the MIP. The system enables the inclusion of content elements such as interactive exercises and quizzes. The coach utilizes libraries of interest-area-specific content provided by others and can also upload his own content and record audio, video, and text messages to be included in the MIP.

In an illustrative embodiment, the coach can use a system tool to create quizzes of any length in multiple-choice format. The coach can determine which categories of users will be permitted to contribute to the libraries in his space and the system enforces these provisions and can tag content elements he creates for his MIPs to enable searchability. The coach can configure various permissions for viewing content in the MIP, including permission for other coaches to view, distribute, or modify content that the coach contributes. Completing the creation of a MIP triggers the sending of automatic notifications such as email and SMS notifications about the new MIP to the PCs and mobile devices of the students.

An illustrative embodiment of a MIP according to the invention includes interactive components which require a student to complete a quiz or perform an animated on-screen exercise, for example. The results of such interactive exercises are automatically transmitted to the server for viewing by the coach.

Figure 3:
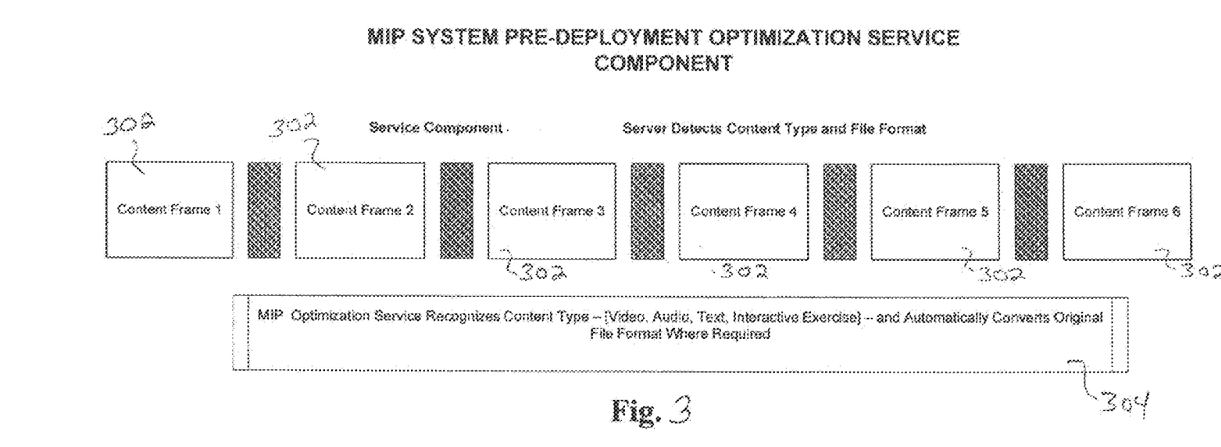
FIG. 3 is a component block diagram of an optimization service component for detecting content type and file format according to an illustrative embodiment of the present invention.

Illustrative embodiments of a MIP creation system according to the present invention sense the type of media, such as photo media, video media, interactive exercise media, or audio track media, that a superior has added to each frame in his MIP and optimizes the media for playback on specific mobile devices and PCs. An optimization service component for detecting content type and file format according to an illustrative embodiment of the present invention is described with reference to FIG. 3. The MIP typically includes a plurality of content frames 302 that are accessed by a subordinate. Typically, the system enables the subordinate to transition between the frames 302 and control the timing of transitions between frames 302, for example. The MIP optimization service 304 recognizes the content type of each content frame 302 and automatically converts the content from an original file format to a format that is optimized for specific mobile devices or PCs that are used by the subordinate, e.g. the student.

The MIP optimization process for optimizing the MIP for showing on a mobile device according to an illustrative embodiment of the invention can adjust the screen aspect ratio based on each student's registered mobile device. Video content is converted to a compatible format and optimal codec. Audio recording is performed independently of any resident audio-recording feature on the coach's PC. The optimization process determines whether the length of a video is appropriate for a MIP and, if not, notifies the coach to substitute an alternative.

Figure 4:
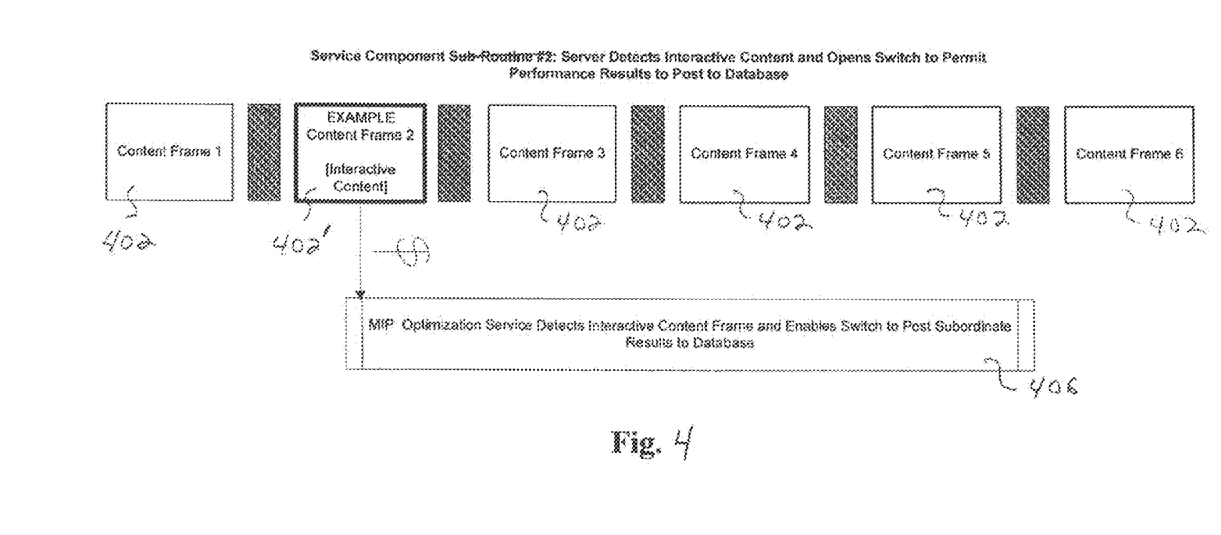
FIG. 4 is a component block diagram of an optimization service component for detecting interactive content according to an illustrative embodiment of the present invention.

In the illustrative embodiment, the optimization process detects interactive content choices and provides performance reporting options for coach and student. The MIP optimization process then processes the raw MIP; and presents the finished product on the coach's PC screen for preview and editing. A service component server for detecting interactive content for posting performance results is described with reference to FIG. 4. The MIP includes one or more content frames 402 in which at least one particular content frame 402' includes interactive content. Interactive content generally includes results of an interaction of a subordinate with the MIP. The MIP optimization service 406 detects the interactive content frame(s) and enables a switch to post the subordinate results to a database.

The system according to illustrative embodiments of the invention can deploy a MIP to mobile devices by coding the completed MIP for optimal performance on specific mobile operating systems, mobile browsers, and mobile media players which are registered by each of the subordinates. The system automatically generates an SMS notification to the subordinate with an embedded link to the MIP. The system can also automatically detect the mobile phone number of a subordinate accessing a MIP from their mobile device in order to automatically authenticate the user and provide immediate access without requiring a manual login operation.

Figure 5:
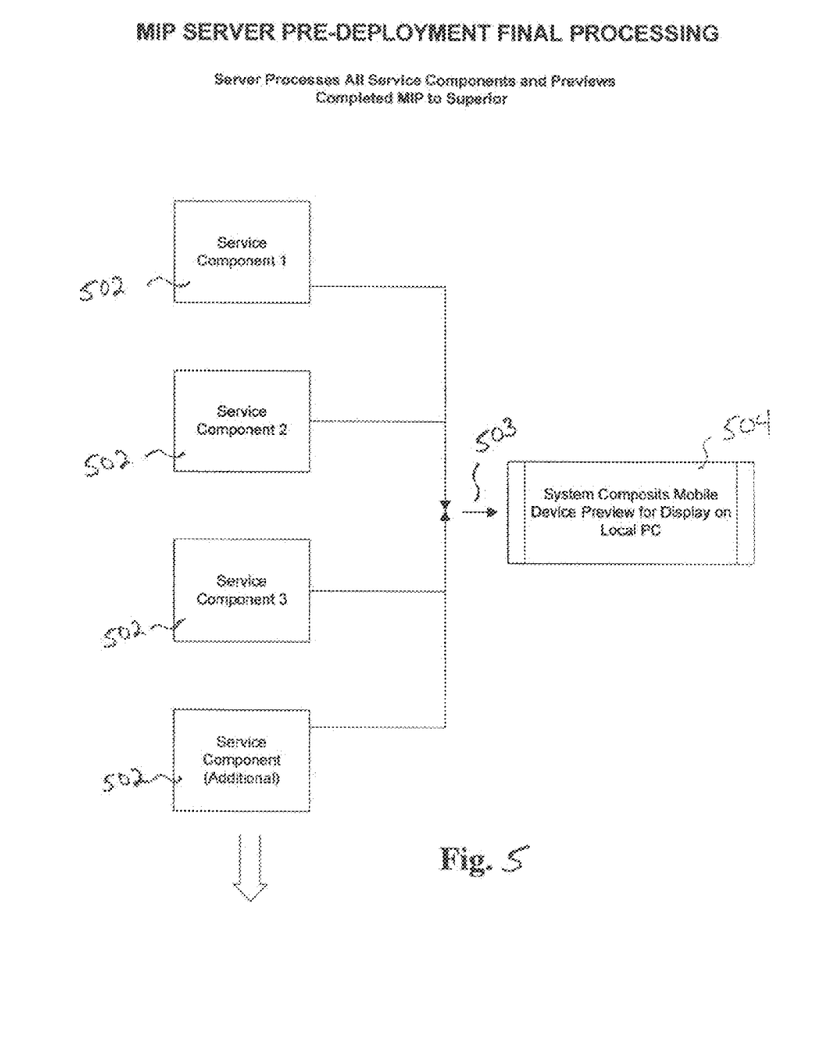
FIG. 5 is system block diagram for final processing of service components according to illustrative embodiments of the present invention.

Prior to deployment of the MIP, the MIP server generates a mobile device preview for display on a local PC or mobile device of the superior. An illustrative embodiment of MIP server pre-deployment final processing is described with reference to FIG. 5. One or more service components 502 provide output 503 to the server 504. The server 504 composes the output 503 to generate a mobile device preview for display on the superior's PC or mobile device.

Illustrative embodiments of the invention include a mobile deployment process. The mobile deployment process matches a user ID of a subordinate against a model and operating system of the mobile device that the subordinate has registered. The mobile deployment process converts the streaming audio and video segments to the media player resident on the subordinate's registered mobile device, resizes the MIP for optimal viewing on the subordinate's registered mobile device and adjusts for any processing characteristics of the subordinate's registered mobile device. The mobile deployment process then sends an SMS notification to the subordinate's registered mobile device.

The system provides an embedded link in the SMS to the specific MIP being deployed. The system can then automatically authenticate the subordinate who is accessing a MIP from his mobile device to by-pass a manual login process, or alternatively allow the subordinate to automatically log in.

In the illustrative embodiment, the system posts a link to each new MIP on a PC portal page of the subordinate. The system automatically updates the MIP database and the superior's management page.

Figure 6:
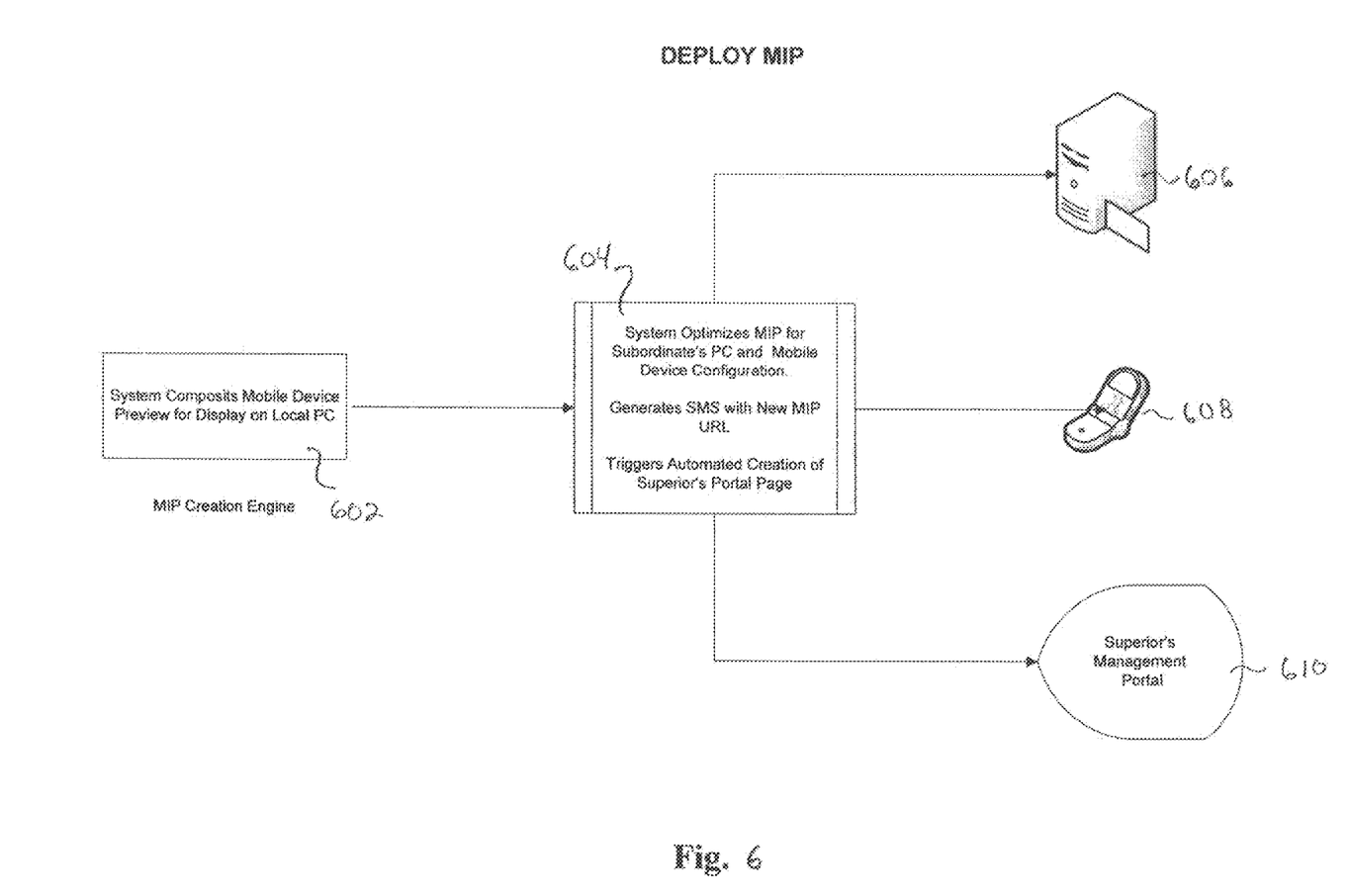
FIG. 6 is system block diagram illustrating deployment of a MIP according to illustrative embodiments of the present invention.

Deployment of a MIP according to an illustrative embodiment of the invention is described with reference to FIG. 6. The system includes a MIP creation engine 602 which generates a mobile device preview for display on the superior's PC as described above with reference to FIG. 5. The system 604 optimizes the MIP for a subordinate's PC 606 and/or mobile device 608. The system 604 generates an SMS with a new MIP uniform resource locator ("URL") configuration 604, as described above with reference to FIGS. 3 and 4, and transmits the SMS to the subordinate's mobile device 608. Deployment of the MIP also triggers the system to automatically create a superior's management portal page 610.

Illustrative embodiments of the system can provide the superior with a management screen that can be used to perform functions such as inviting new subordinates to register; managing existing subordinates and teams to which the superior may assign them; creating new modules and editing existing modules; viewing subordinates' MIP utilization and performance on any included exercises; posting the subordinates' own user-generated MIP-content to a broader community of the superior's colleagues; reviewing content uploaded by the subordinates and authorizing distribution of such content to his other subordinates; sending and receiving messages to individual subordinates, sub-groups of subordinates, or an entire subordinate population.

In the illustrative embodiments, the superior has ultimate control over the database. Such control allows the superior to add a subordinate or file of subordinates and delete subordinates, for example. The superior can also close a MIP database to any new people who attempt to register.

Individuals invited by the coach to interact using a MIP are able to self-register in the coach's database of students. At that time, the student indicates a preferred mobile contact device (if any), cellular carrier, and mobile address (e.g. mobile telephone number). This information is used by the system to configure the MIP for viewing on that mobile device. When the student registers in the database, the system creates a student portal, which contains information provided and managed by the coach and information fields provided by the system.

Figure 7:
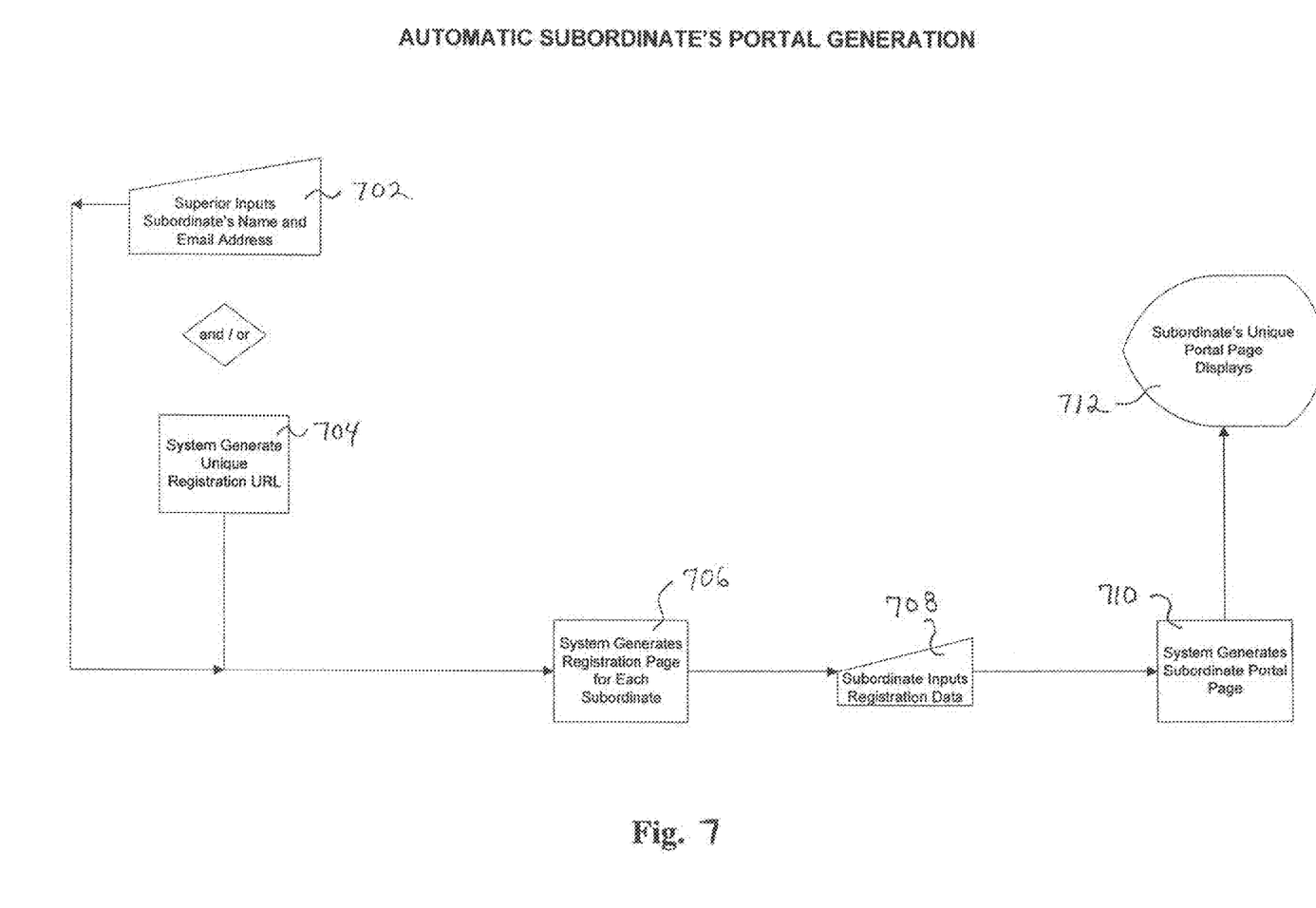
FIG. 7 is a process flow diagram showing automatic subordinate's portal generation according to an illustrative embodiment of the present invention.

A process for automatic generation of a subordinate's portal according to an illustrative embodiment of the invention is described with reference to FIG. 7. First, a superior inputs the name and email address of a subordinate 702. Additionally or alternatively, the system can automatically generate a unique registration URL 704. The system then generates a registration page for each subordinate 706. When a subordinate inputs registration data 708 to the registration page, the system automatically generates a subordinate portal page 710. The subordinate may then display 712 and interact with the unique portal page on the superior's mobile device or PC. In the illustrative embodiment, the portal is designed to be viewed on a PC. However it is envisioned that various portals may be designed for viewing on mobile device, or virtually any other computing device within the scope of the present invention.

The subordinate's portal is configurable by the superior, who can create different portal content for different types of subordinates. The subordinate also has permissions to add custom features to the superior's own portal page, such as posting photos and videos for the superior's own viewing. If a MIP involves interactive content such as student exercises, for example, the system stores any MIP exercise performance data. In an illustrative embodiment, the system can also produces trend analyses whenever a subordinate performs an exercise more than once, for example.

The system stores data about which subordinates accessed which MIP and how often. The superior can review and authorize content created or uploaded by a subordinate for distribution out to the coach's other students. The superior or subordinate may give certain people permission to view the subordinate's portal page via a permission entry in the subordinate database. For example, in an embodiment wherein the superior is a teacher or coach and the subordinate is a student, the student may give a the parent permission to view the student's portal page.

Figure 8:
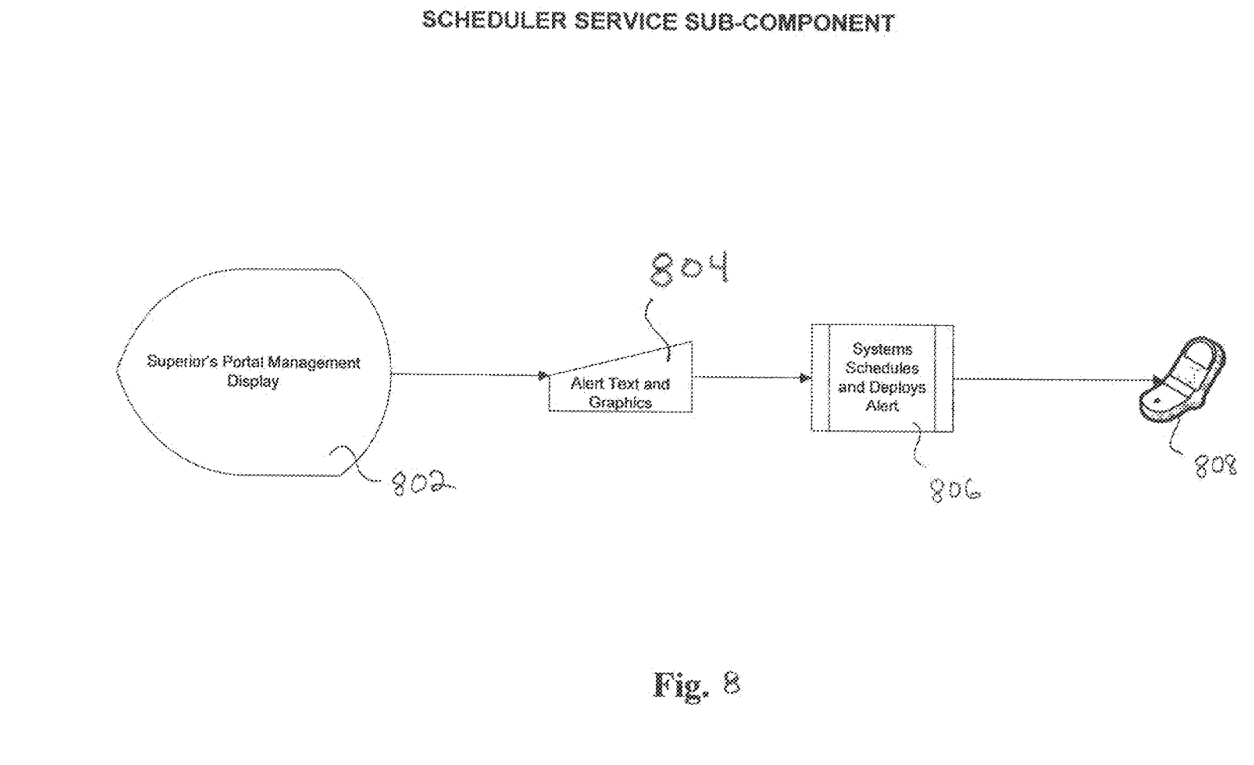
FIG. 8 is a system block diagram illustrating a scheduler service sub-component according to an illustrative embodiment of the invention.

In illustrative embodiments of the invention, the system can also be configured to automatically send reminders to a subordinate's mobile device. The text, frequency and timing for such reminders can be entered by the superior or subordinate in the subordinate database. A scheduler service subcomponent according to an illustrative embodiment is shown in FIG. 8 in which a superior accesses the system via the superior's portal management display 802. The system enables the superior to define alert text and graphics 804. The system 806 then schedules and deploys the alert for notification according to the defined schedule on the subordinate's mobile device 808.

A subordinate database and authorization processes are described with reference to an illustrative embodiment of the invention in which the superior is a coach and subordinates are students. The coach can log in to a portal page, such as a page called "My Teams" on the superior's management portal. The coach can then select a student whose record he wants to view in more detail. The system generates an screen with information about that student.

The system provides a student database which allows the coach to manage assignment of students to various teams, view the number of times a student has access the MIP and view particular students' utilization of MIPs that the coach has sent. The coach may also drill down to view a student's performance on any individual quiz including overall score and specific questions the student answered incorrectly. Illustratively, the coach may also drill down to see the student's performance on animated interactive exercises, including scores on any individual exercise and performance data trended over time. The coach may also review messages sent from the student to the coach and review, authorize or decline requests from the student to share photo or video content with the coach's other students.

In the illustrative embodiment, the authorization service may allow only the coach to update the student's level, for example, whereas the student will be permitted to update their "preferred mobile device." A "student level" field may be provided to indicate which students get certain announcements, including announcements that a new MIP is ready, for example. The "preferred mobile device" field provides information to the system so that the scheduler knows to which device the announcements should be deployed. The proffered mobile device information is also usable by the MIP optimizer service to optimize the MIP for the student's device.

Reminder fields can be stored in the scheduler's database. The reminder fields may contain the student ID of the student to receive a reminder, the text of the reminder, and the dates/times that the reminder should be sent. Illustratively, the scheduler checks the student database to determine the mobile device to which the reminder should be sent.

Illustrative embodiments of the invention enable subordinate shaping of a MIP using a MIP tagging process. The MIP tagging process tags each media element used in the MIP with an authorization code that indicates what category of individuals are authorized to change that element in the MIP. The MIP itself is tagged by the system to indicate whether new elements can be added and whether the original MIP author or the superior must approve the revisions prior to the MIP being saved or MIP announcements sent to subordinates in the database.

To begin shaping a MIP, a subordinate logs in, selects a MIP, and indicates the desire to shape the MIP. The system decomposes the MIP into its elements and provides information on which elements can be shaped by the subordinate. The system also provides a view of the content libraries and tools available to the subordinate for shaping.

The subordinate can substitute elements from the libraries for elements in the MIP. The subordinate may also add one or more elements to the MIP or delete one or more elements from the MIP. The MIP tagging service tags the MIP with revision data, renames the MIP to indicate it has been revised, and produces a "credits" slide to roll at the end of the MIP giving credit to all who contributed.

The student indicates to whom they wish the MIP to be deployed and the MIP optimization service optimizes the revised MIP. The MIP deployment service either notifies the original MIP author or coach to review the MIP or, if prior permission has been given, calls the MIP deployment service.

Although various illustrative embodiments of the present invention are described herein with reference to mobile devices such as subordinate's mobile devices, persons having ordinary skill in the art should appreciate that the various embodiments of the invention can be implemented or employed using any number of devices that may not necessarily include mobile devices. For example, a subordinate's preferred device can be a mobile phone, hand held computer, desktop computer, or other internet appliance within the scope of the present invention.

Although various illustrative embodiments of the invention are described and claimed herein with reference to superiors and subordinates for clarity and conciseness, persons having ordinary skill in the art should appreciate that the labels "superior" and "subordinate" do not necessarily connote any hierarchical relationship between the parties. For example, various illustrative embodiments of the invention include generation and deployment of a MIP for peer to peer communication or communication between parties with no actual superior/subordinate relationship. It is envisioned that in some embodiments, one or more "subordinates" could even have a higher stature than a "superior" as described in the present specification without departing from the scope of the present invention.

Although the various illustrative embodiments of the invention are described herein with reference to "portals" is should be understood by persons having ordinary skill in the art that a "portal" as described herein should be broadly appreciated as any of various types of interfaces facilitating communication within the scope of the present invention.

Although illustrative embodiments of the invention are described herein with reference to SMS notifications sent to subordinates, it should be appreciated by persons having ordinary skill in the art that various other types of notifications may be automatically sent to subordinates within the scope of the invention. Such notifications could include email, pager notifications or automated telephone calls, for example.

While the invention has been described with reference to illustrative embodiments, it should be understood by those skilled in the art that various other changes, omissions, and/or additions may be made and substantial equivalents may be substituted for elements thereof without departing from the spirit and scope of the invention. In addition, many modifications may be made to adapt a particular situation or material to the teaching of the invention without departing from the scope thereof. Therefore, it is intended that the invention not be limited to the particular embodiment disclosed for carrying out this invention, but that the invention will include all embodiments, falling within the scope of the appended claims. Moreover, unless specifically stated any use of the terms first, second, etc., do not denote any order of importance, but rather the terms first, second, etc. are used to distinguish one element from another.

What is claimed is:

1. A method for automatically generating an interactive program by a superior for communication between the superior and at least one subordinate, the method comprising:
   receiving at least one content selection for said interactive program from the superior;
   receiving a subordinate list including said at least one subordinate to be provided with access for interaction with said superior through said interactive program via a preferred device of said at least one subordinate;

automatically generating the interactive program including said at least one content selection;

automatically generating a superior management portal for managing interactions with at least one of said interactive program and said at least one subordinate;

automatically generating a subordinate access portal for access by said at least one subordinate on said subordinate list, said subordinate access portal providing access by said at least one subordinate to at least one of said interactive program and said superior;

automatically sending a notification to said at least one subordinate in response to said generation of the interactive program; and viewing subordinates' utilization of selected interactive programs.

2. The method of claim 1, further comprising the step of receiving a registration by said at least one subordinate including a subordinate identifier and preferred device information of said preferred device of said at least one subordinate to access said interactive program from said preferred device of said at least one subordinate.

3. The method of claim 1, further comprising the step of automatically converting said at least one content selection to a format chosen for improved performance on said preferred device of said at least one subordinate according to said preferred device information.

4. The method of claim 3 wherein said converting step comprises converting audio streaming and video segments to a media player format of a media player resident on said preferred device of said at least one subordinate.

5. The method of claim 1, further comprising the step of providing a content library to facilitate selection of said at least one content selection by said superior.

6. The method of claim 1, further comprising the step of automatically generating interactive program preview accessible by the superior.

7. The method of claim 2, further comprising the step of automatically authenticating registration of said at least one subordinate to allow bypass of a manual login process by a registered at least one subordinate.

8. The method of claim 1, further comprising the step of providing an interactive program link to the interactive program on said subordinate access portal.

9. The method of claim 1, viewing subordinates' performance on exercises included as content in selected interactive programs.

10. The method of claim 1, wherein said superior management portal facilitates management of a database by said superior, said database including registrations of said at least one subordinate and interactive program access privileges of said at least one subordinate.

11. The method of claim 1 wherein said subordinate access portal is configurable by said superior.

12. The method of claim 1, further comprising the step of configuring at least one of said superior management portal and said subordinate access portal to automatically send reminders to said preferred device of said at least one subordinate.

13. The method of claim 1, further comprising the step of tagging a media element of said at least one content selection with an authorization code that indicates selected ones of said at least one subordinate as authorized to change said media element.

14. The method of claim 1, further comprising the step of customizing said interactive program by said at least one subordinate.

15. The method of claim 1, wherein said notification comprises a short message service (SMS) notification.

16. A computer implemented system for managing preferred content comprising:

a server in communication with a superior via a network;

a program creation module including a user interface, said program creation module adapted to receive a content selection from said superior via said user interface and to automatically generate an interactive program including said content selection;

the program creation module further adapted to receive, via said user interface, a list of at least one subordinate invited to register for receiving said interactive program;

a deployment module in communication with said program creation module, said deployment module adapted to automatically generate a notification of said interactive program to said at least one subordinate on said list;

a registration module adapted for receiving a registration of said at least one subordinate, said registration including at least one of a subordinate identification and preferred device information of said at least one subordinate for a subordinate preferred device for accessing said interactive program;

an optimization module adapted for converting said content selection to a format chosen for improved performance on said subordinate preferred device according to said preferred device information; and a superior management portal for viewing subordinates' performance on exercises included as content in selected interactive programs by a superior.

17. The computer implemented system of claim 16, further comprising: a database system accessible by said superior to manage interactions with said at least one subordinate, said database selectively accessible to contribute information designated for access by at least one of said superior and said at least one subordinate.

18. The computer implemented system of claim 16, wherein said program creation module is configured to generate a preview of said interactive program for display to said superior.

19. The computer implemented system of claim 16, wherein the superior management portal is configured to view subordinates' utilization of selected interactive programs.

20. The computer implemented system of claim 16, further comprising:

an alert/scheduler module adapted to receive reminder text and timing information from at least one of said superior and said at least one subordinate, said alert/scheduler module further adapted to automatically send reminders to at least one of said subordinates' preferred device in accordance with text and timing information.

21. A machine-readable storage system for managing mobile content comprising machine instructions, the instructions executable by a processor to cause the processor to perform operations, comprising:

receiving content selections from the superior;

receiving a list of subordinates to be provided with a mobile interactive practice program;

automatically generating the mobile interactive practice program including said content selections;

automatically generating a superior management portal for managing interactions with the mobile interactive practice program;

automatically generating a subordinate access portal for each of said subordinates, said subordinate access portals providing access to by said subordinates to mobile interactive practice program;

automatically sending a short message system notification to said subordinates in response to said generation of the mobile interactive practice program, said notification including a hyperlink to said mobile interactive practice program; and enabling a superior to view a subordinates' performance on exercises included as content in selected interactive programs through a superior management portal.

* * * * *